July 12, 1949.  P. KLAMP  2,475,902
CONTINUOUS GEAR GRINDING MACHINE
Filed Sept. 5, 1946  5 Sheets-Sheet 5
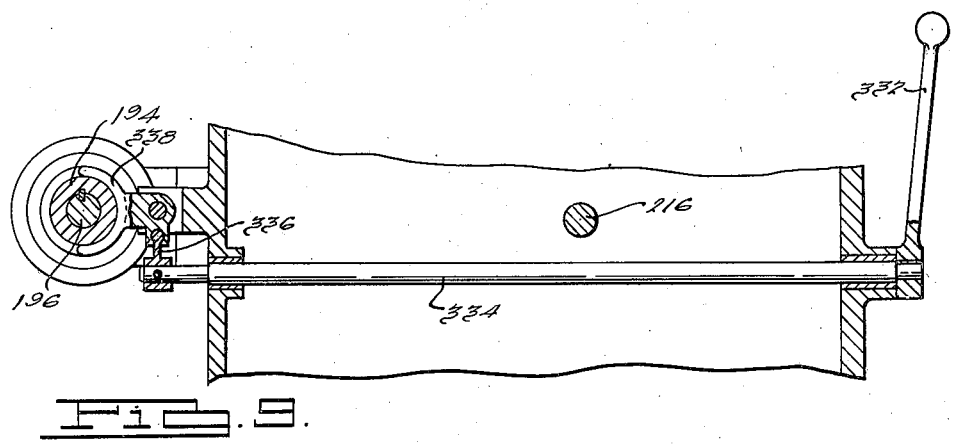
Fig. 9.
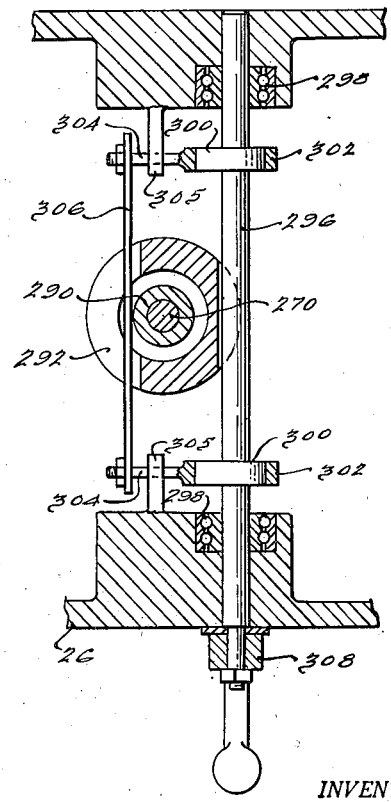
Fig. 10.
Fig. 11.
INVENTOR.
Paul Klamp.
BY
Harness, Dickey & Pierce
ATTORNEYS.

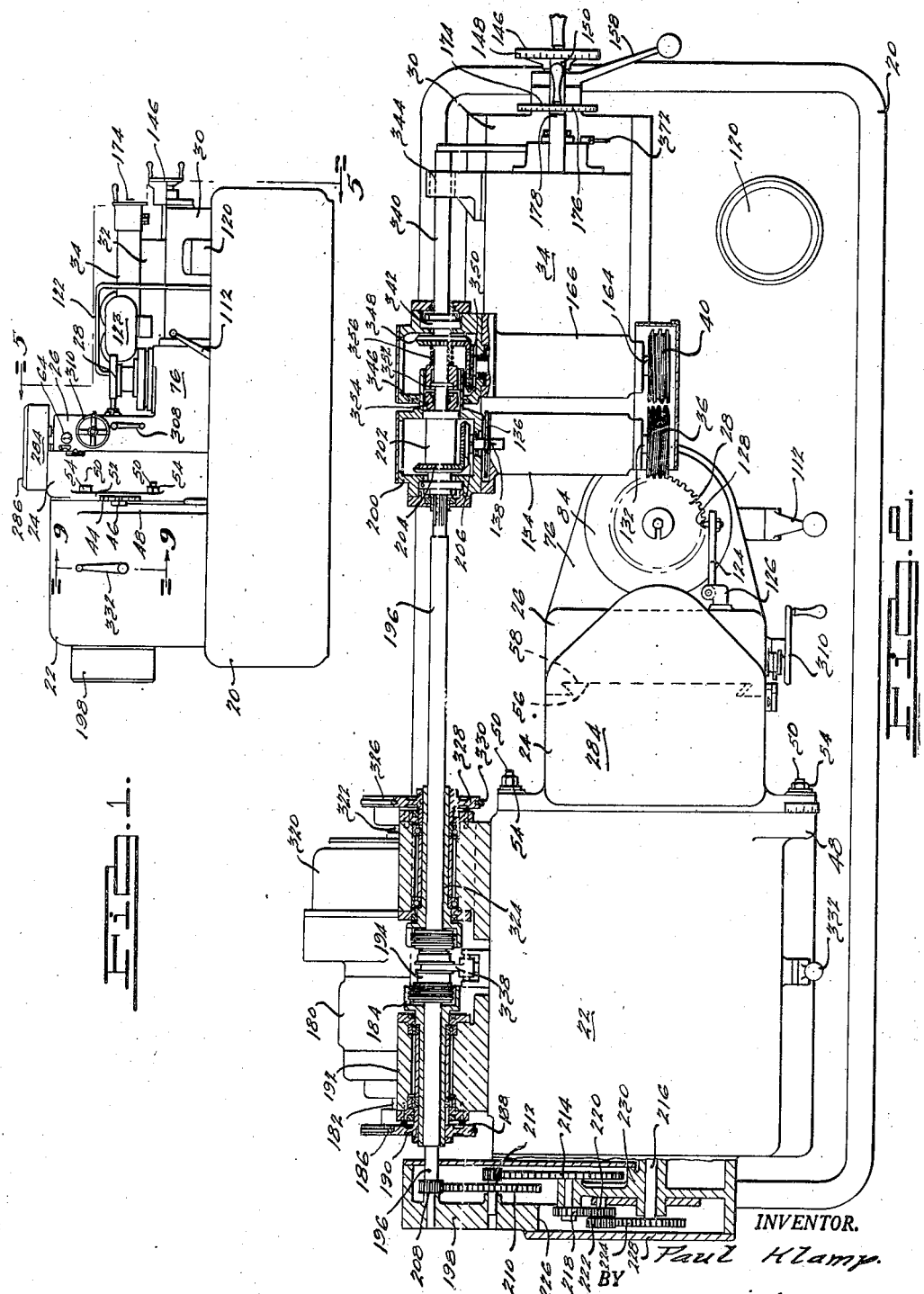

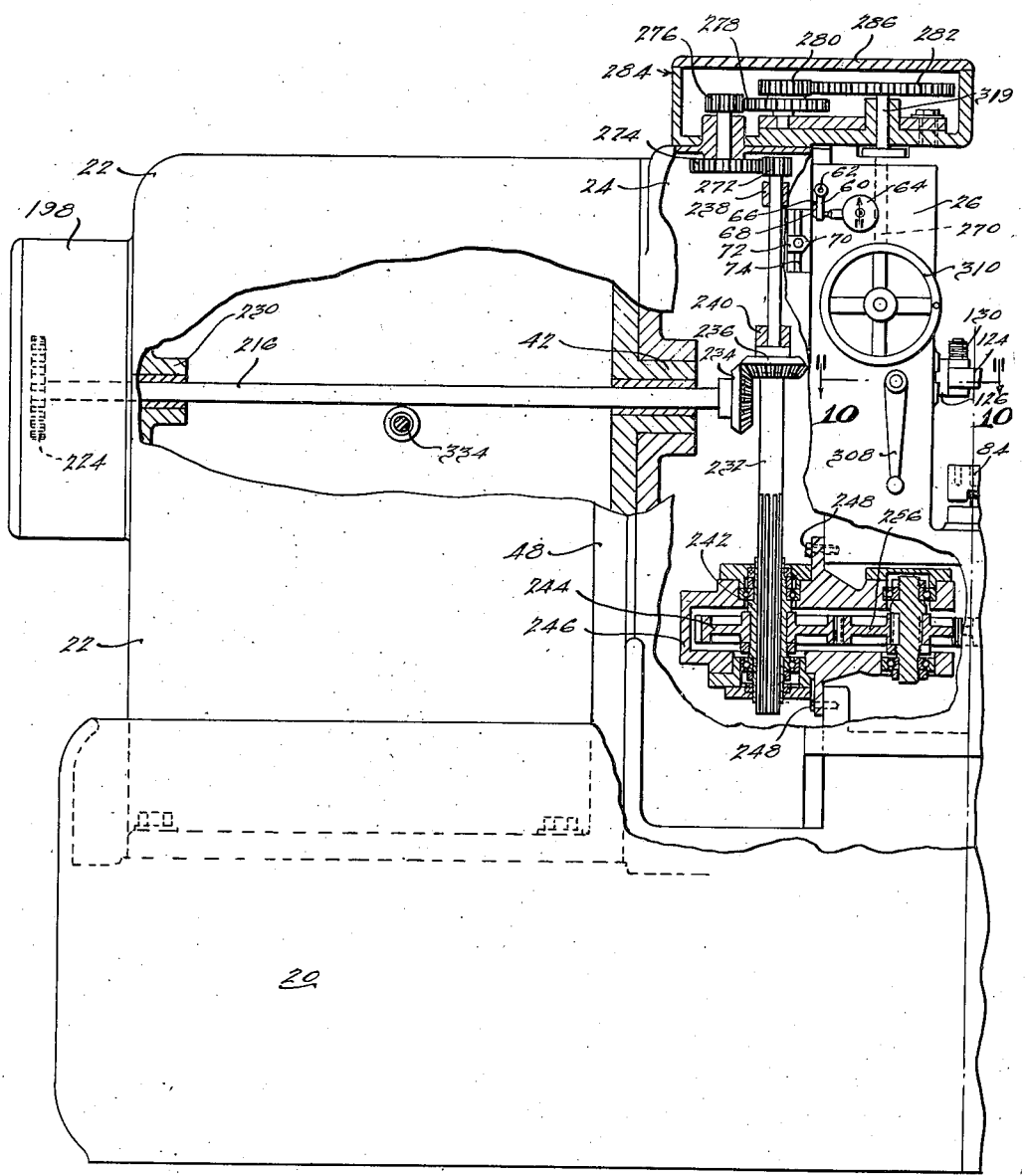

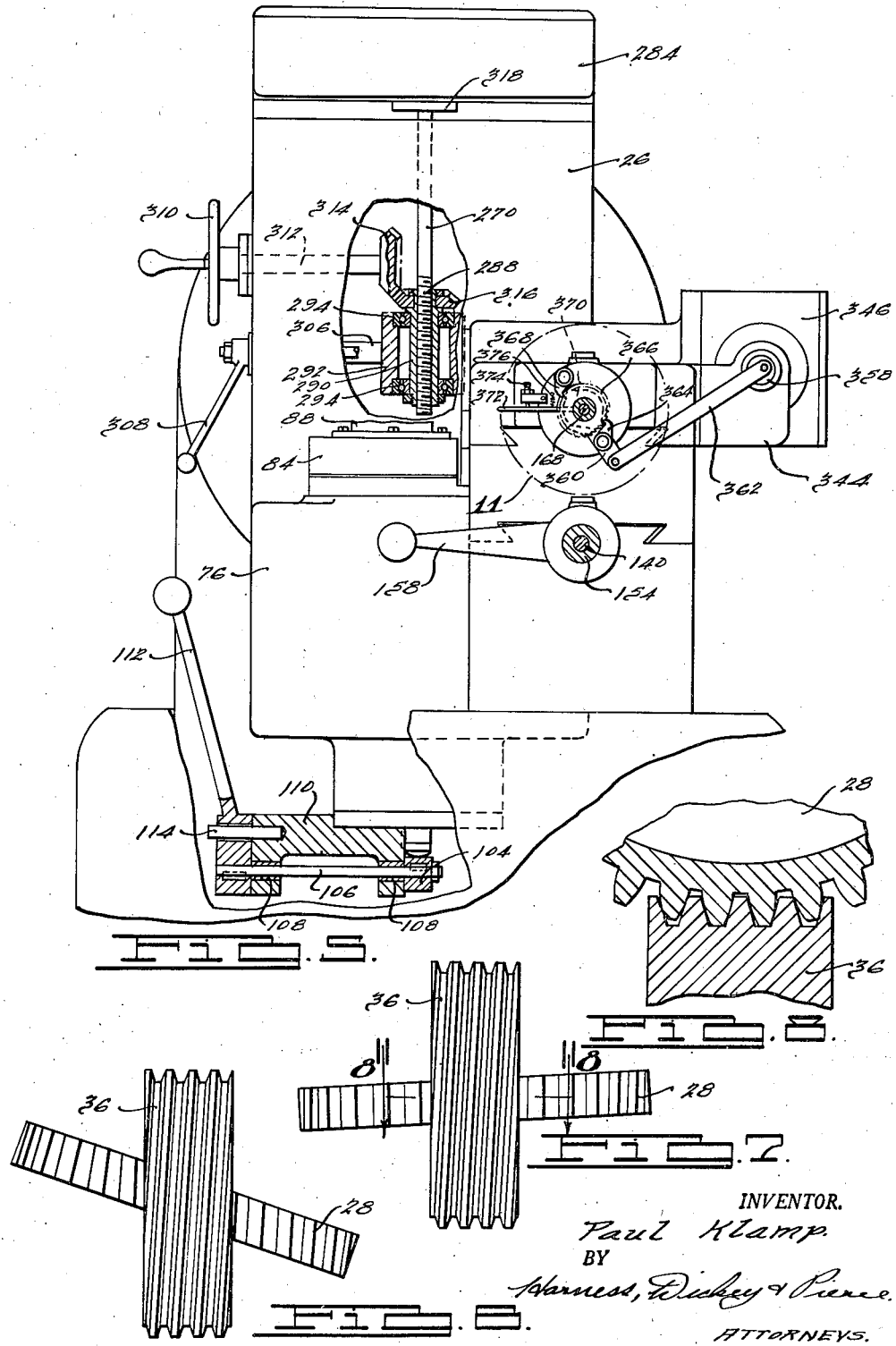

Patented July 12, 1949

2,475,902

UNITED STATES PATENT OFFICE 2,475,902

CONTINUOUS GEAR GRINDING MACHINE

Paul Klamp, Detroit, Mich., assignor to The Cross Company, Detroit, Mich., a corporation of Michigan Application September 5, 1946, Serial No. 694,942

19 Claims. (Cl. 51—95)

This invention relates broadly to continuous gear-grinding machines.

Gears of hardened metal are more durable than gears that have not been hardened. However, the hardening of gears tends to distort the accurate form of the teeth. Therefore, it is desirable to leave grinding stock when cutting the teeth, then harden the gears and finish the teeth by a grinding operation.

An important object of the present invention is to provide a gear-grinding machine that is faster and more efficient than conventional equipment.

Another object of the invention is to provide a gear-grinding machine that operates continuously and eliminates idle periods required for the return stroke of the grinding wheel and for operation of gear indexing mechanism in conventional reciprocating type gear grinders.

Still another object of the invention is to provide a machine of the above-mentioned character that acts upon the gear form in such manner that both sides of the teeth are ground simultaneously and symmetrically.

Yet another object of the invention is to provide a machine of the above-mentioned character that divides the removal of stock and distributes wear on the grinding wheel by uniquely forming the latter and associating it with the work in such manner that multiple contact points are established therebetween.

A further object of the invention is to provide a machine of the above-mentioned character that includes mechanism for quickly and efficiently dressing the grinding wheel.

A still further object of the invention is to provide a grinding machine of the above-mentioned character that is capable of handling spur or helical gears, ratchet wheels, saw teeth, slotting cutters, external, involute, blind-end teeth on pinions or spline shafts and the like.

A yet further object of the invention is to provide a machine of the above-mentioned character that can be readily adapted for grinding teeth in a solid gear blank.

Other objects and advantages of the invention will be apparent during the course of the following description.

In the drawings forming a part of this specification and wherein like numerals are employed to designate like parts throughout the same, Fig. 1 is a front elevational view of a continuous gear-grinding machine embodying the invention;

Fig. 2 is an enlarged top plan view thereof, parts being broken away and shown in section for clearness of illustration;

Figs. 3 and 4 are enlarged, front elevational views showing adjacent halves of the machine, parts thereof being broken away and shown in section;

Fig. 5 is an enlarged, vertical sectional view taken on the line 5—5 of Fig. 1;

Fig. 6 is an elevational view illustrating the manner in which a helical gear is associated in the machine with the grinding wheel;

Fig. 7 is a view similar to Fig 6 but showing the relationship between the grinding wheel and a spur gear;

Fig. 8 is a fragmentary, transverse sectional view taken on the line 8—8 of Fig. 7;

Fig. 9 is an enlarged, vertical sectional view taken on the line 9—9 of Fig. 1;

Fig. 10 is an enlarged, transverse sectional view taken on the line 10—10 of Fig. 3; and Fig. 11 is an enlarged view of the portion of Fig. 5 enclosed in the circle 11.

Figure 4:
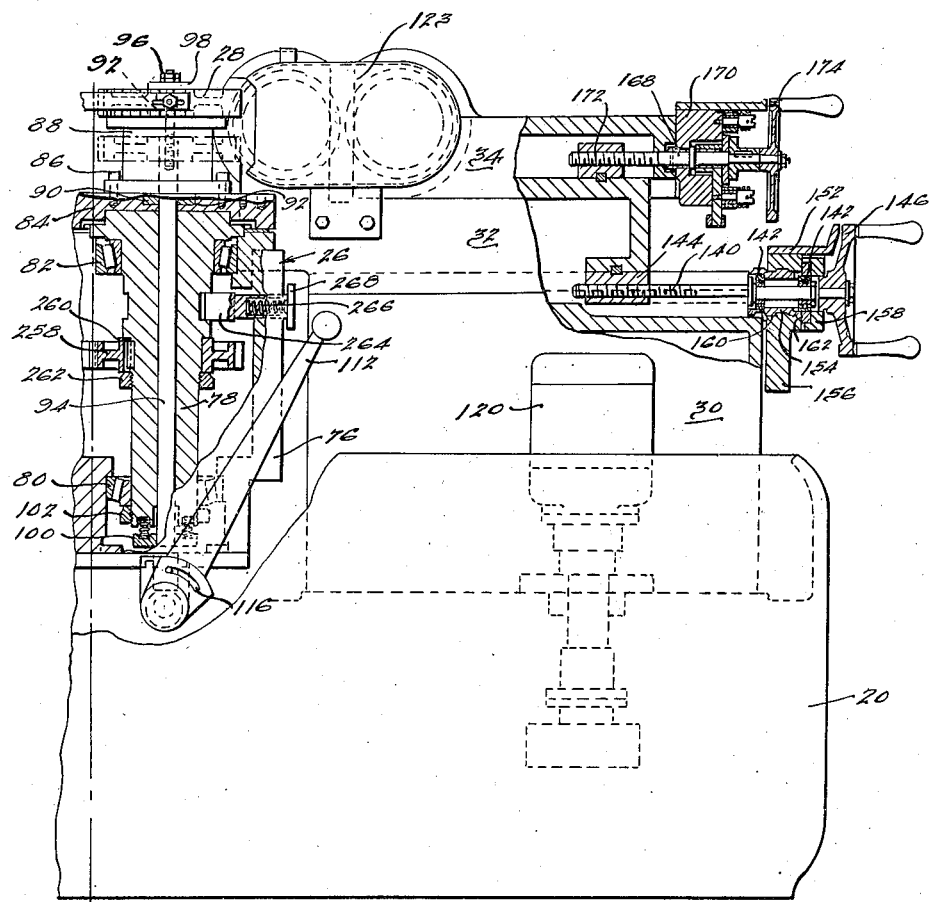

Considered in certain of its broader aspects, the machine embodying the present invention comprises a base 20 which preferably is in the form of an elongated, hollow casting. Mounted on the base 20 adjacent one end thereof is an upright work head column 22 which pivotally supports a swivel 24 for movement about a horizontal axis. The latter, in turn, carries a vertically slidable work spindle head 26 which has provision for holding and rotatably supporting a suitable workpiece such as the spur gear 28. Mounted on the base 20 laterally of work spindle head 26 is a slide base 30 which supports a pair of superposed, independently movable slides 32 and 34. Slide 32 carries a grinding wheel 36 in operative association with the workpiece 28, and slide 34 carries a crush roller 40 which is positioned in operative association with the grinding wheel (Figs. 2 and 4).

With reference to the operation of grinding the workpiece 28, it will be observed that grinding wheel 36 is formed with a helical, peripheral cutting thread which matches the teeth of the workpiece (Figs. 2 and 8), and provision is made for advancing and retracting slide 32 to bring the wheel and workpiece into operative relationship. Suitable drive means is provided for rotating grinding wheel 36 at a relatively high speed suitable for grinding. In this connection, speeds in the order of 5100 R. P. M. are satisfactory. This drive mechanism also is operative to rotate workpiece 28 in timed relation with grinding wheel 36 and simultaneously to slidably actuate the work spindle head 26 so that the workpiece moves from the dotted-line position to the full-line position in Fig. 4. Workpiece 28 preferably rotates at a speed which causes it to advance or index one tooth for every revolution of the grinding wheel. For example, if the grinding wheel 36 rotates approximately 5100 R. P. M., a gear having 48 teeth would be rotated approximately 105 R. P. M. Manifestly, however, this ratio will vary, depending on the number of teeth in the workpiece. As best shown in Fig. 4, as the workpiece travels from the full- to the dotted-line position, its periphery moves across the cutting surface of grinding wheel 36, and, during such movement, its teeth mesh with the external thread of the wheel. In the case of the gear hereinabove referred to, the vertical travel should require approximately one and one-half minutes. During this travel, workpiece 28 rotates approximately 158 times, and, as it moves across the grinding wheel 36, its teeth are moved progressively and repeatedly against the grinding wheel. By reason of the fact that the gear teeth and the cutting thread complement each other (Fig. 8), stock is removed progressively from each tooth as it moves past the wheel, and both sides of the tooth are ground simultaneously. Thus no single surface of the grinding wheel does all the cutting as in conventional grinding machines; instead, the removal of stock is divided among a plurality of cutting surfaces and wear on the wheel is correspondingly distributed.

The above mode of operation produces generated ground teeth in a fraction of the time required by present-day apparatus. The grinding operation on each workpiece is continuous, and there are no idle periods taken up by the return stroke or by gear indexing as in conventional reciprocating-type grinders. Also, the speed of the traversing motion between wheel and work can be relatively great, since this motion is rotary and is not limited by unbalanced dynamic forces which place a definite limit on the operating speed of reciprocating types of gear-grinding machines.

With reference to the operation of dressing grinding wheel 36, the crush roller 40 is of substantially the same diameter as the grinding wheel and is formed with a peripheral surface which complements the cutting thread on the wheel. In the form of the invention here shown, where the cutting surface of the grinding wheel is a thread or helix, the thread on the grinding wheel has a left-hand pitch and the thread on the crush roller has a right-hand pitch. Provision is made for actuating slide 34 to bring crush roller 40 against the grinding wheel 36 with the threads of the two elements in accurately matched relationship. It will be obvious to those skilled in the art that the crush roller is of hardened steel or other suitable material capable of forming the grinding wheel. Also, a slow speed drive is provided for synchronously rotating the grinding wheel 36 and crush roller 40 in opposite directions so that the wheel is dressed as the roller is pressed thereagainst and for simultaneously rotating the work support in timed relation to the grinding wheel so that the relative rotary positions of the latter elements are not disturbed during the dressing operation. Any speed suitable for crush dressing can be employed, and this speed may vary somewhat, depending on the particular circumstances. In general, however, the surface speed of grinding wheel 36 and crush roller 40 should be about 250–300 feet per minute.

For a more detailed description of the invention, attention is first directed to Figs. 3 and 4. Work-head column 22, swivel 24, and work spindle head 26 are generally in the form of hollow castings and collectively contain and support certain of the actuating and driving mechanisms. It will be observed that swivel 24 is mounted on and rotatably supported by a fixed bearing 42 which projects horizontally from the inner vertical wall of work-head column 22. Since the work-supporting head 26 is carried by swivel 24, rotative adjustment of the latter varies the relative angular position of the workpiece 28 and grinding wheel 36. Such adjustment is necessary to match the teeth of the workpiece with the cutting thread of the grinding wheel. When grinding spur gears or the like, the swivel 24 is positioned so that the plane of the gear is disposed substantially parallel with the axis of the grinding wheel (Fig. 7); however, when grinding helical gears or the like, the swivel 24 is rotatably adjusted to position the gear at an angle to the axis of grinding wheel 36. A graduated scale 44 on the periphery of swivel 24 co-operates with a stationary reference mark 46 on workhead column 22 to indicate the rotative adjusted position of the swivel and workpiece. Radial flanges 48 at opposite sides of the work-head column 22 carry forwardly projecting studs 50 which extend through elongated slots in confronting radial flanges 52 on the swivel 24. Nuts 54 on the projecting ends of studs 50 are loosened to permit adjustment of the swivel and tightened to hold the same solidly in the selected adjusted position.

As shown in Fig. 2, the work spindle head 26 is formed with a vertical guideway 56 which receives and is slidable on a vertical guide or track 58 provided on the swivel 24. Manifestly, the vertical travel of head 26 is small, since its only purpose is to move the workpiece 28 across the cutting face of grinding wheel 36. A typical example of this movement is shown in Fig. 4 wherein the workpiece 28 is moved from the dotted-line position to the full-line position, and the distance between these two positions constitutes the vertical travel of the work spindle head 26.

When grinding a plurality of identical gears it is desirable that the work spindle head 26 occupy the same starting position for successive operation. This is particularly important in the case of helical gears. According to the present invention, the operator is able to reset head 26 quickly and accurately after each grinding operation by reason of a suitable gage which is mounted on the front of the machine. This gage indicates visibly when head 26 reaches the initial or starting position and comprises a depending lever 60 which is mounted for rocking movement about a horizontal pivot 62 on the head. Also mounted on head 26 is a dial indicator 64 which engages the lever 60 to hold it normally against a stop 66. When the lever 60 is against stop 66, dial 64 registers a zero or neutral position, and, when the lever swings to the right the extent of such movement is registered on the dial. At the lower end of lever 60 is a lateral V-shaped extension 68, and this extension is positioned to engage the V-shaped end 70 of a dog 72, the latter mounted on the swivel 24 and vertically adjustable in a key slot 74. Thus, when work spindle head 26 is lowered on the swivel 24, the extension 68 engages the end 70 and, by reason of the inclined interface therebetween, rocks lever 60 to the right. As suggested, this movement is registered on dial 64, and the mechanism for lowering head 26 is stopped when the dial registers the starting position. As a precautionary measure to prevent jamming of the indicator dial 64 in case the work spindle head 26 is lowered inadvertently beyond the desired starting position, the extension 68 is of such length that it can ride safely past the dog 72.

It is contemplated that head 26 be raised at a constant predetermined rate of speed by power-actuated mechanism and that it be lowered manually for resetting. This mechanism is hereinafter described in detail.

As shown in Fig. 1, the work spindle head 26 is formed at its lower end with a laterally extending portion 76 which carries mechanism for rotatably supporting and detachably clamping a workpiece 28. This mechanism is best shown in Fig. 4 and comprises a vertically disposed, tubular work spindle 78 which is supported adjacent its ends by bearings 80 and 82. The upper end of spindle 78 extends above the portion 76 and supports a work table 84 which is bolted or otherwise fastened thereto. Surmounting the work table 84 and fastened thereto by bolts 86 is a work-holding fixture 88. The latter is formed with a depending pilot 90 which normally fits in a pilot hole 92 provided centrally in the table 84. Workpiece 28 (here shown by way of example as a spur gear) rests on the top surface of fixture 88 and is centered with its bore on a pilot 92 which is integral with and projects upwardly from the fixture.

In order to hold the workpiece 28 solidly on fixture 88 during the grinding operation and to render it easily and quickly removable at the end of such operation, a draw rod 94 is mounted for vertical sliding movement in the tubular spindle 78 and in aligning bores provided centrally in the table and fixture. Draw rod 94 extends upwardly through the pilot 92, and the projecting portion thereof carries nuts 96 which confine a clamping plate 98. The latter rests on workpiece 28 and preferably is in the form of a C-washer so that it can be easily and quickly removed from or applied to rod 94 without removal of nuts 96. The lower end of draw rod 94 extends from spindle 78, and the projection portion thereof carries a fixed radially extending follower 100 which co-operates with the adjacent end of the spindle to confine an annular series of compression springs 102. These springs 102 constantly urge draw rod 94 downwardly and with sufficient force so that nuts 96 and clamping plate 98 hold workpiece 28 solidly against the fixture 88 during the entire cycle of operation.

Manifestly, it is necessary to force draw rod 94 upwardly against the action of springs 102 in order to release workpiece 28. According to the present invention this is accomplished by a cam 104 which is fixed on a rock shaft 106 and seats the lower end of the draw rod (Fig. 5). Shaft 106 is supported by spaced bearings 108 in a supporting bracket 110. At its forward end the rock shaft carries a manually operable lever 112. The peripheral surface of cam 104 is arranged eccentrically to the axis of rock shaft 106 so that movement of handle 112 in one direction forces the draw rod 98 upwardly to release workpiece 28 and movement thereof in the opposite direction permits springs 102 to lower the draw rod and clamp the workpiece solidly on fixture 88. Lever 112 normally is positioned and its movement restricted by a pin 114 which is embedded in the bracket 110 and projects forwardly through an elongated actuate slot 116 in the lever.

From the foregoing it will be readily apparent that the work spindle head 26 reciprocates or translates workpiece 28 and moves it across the cutting face of grinding wheel 36 and that spindle 78 rotates the workpiece during such vertical movement. The rate and extent of translatory movement may vary according to the nature of the workpiece; however, as suggested, the workpiece must be rotated in timed relation with the grinding wheel, and the mechanism for accomplishing this end is hereinafter described in detail.

During the grinding operation coolant is circulated by a pump 120 from a suitable reservoir through an eduction tubing 122 which discharges above the work as shown in Fig. 1. The system for circulating the coolant is conventional and need not be described in detail. In the apparatus here shown by way of illustration, the hollow base casting 20 serves as a reservoir for the coolant, and the pump 120 is mounted directly thereon, as shown in Fig. 4. A suitable guard 123 in front of grinding wheel 36 and crush roller 40 prevents the operator from being splashed by coolant and also prevents him from physically contacting the wheel and roller.

In order to control the relative rotary position of workpiece 28 and the fixture 88 and to insure identical positioning of similar workpieces, an arm 124 is supported for pivotal movement about a vertical axis and in horizontal alignment with the work by a suitable bracket 126 on the work spindle head 26. A locator 128 carried by and longitudinally adjustable along the arm 124 is shaped to engage between adjacent teeth of workpiece 28 when the arm is positioned as shown in Fig. 2. However, a torsion spring 130 (Fig. 3) normally acts on the arm 124 to swing it outwardly away from the workpiece so that it is unobstructively positioned during the grinding and setting up operations.

In practice, the first of a series of identical gear forms is mounted on the fixture 88 and matched with the profile of grinding wheel 36 before it is clamped. After the relative positions of the workpiece and grinding wheel have been established in this manner, the workpiece is clamped on the fixture, the grinding operation is performed, and the grinding wheel is stopped in a predetermined initial position by means hereinafter described in detail. Arm 124 is then swung toward the workpiece, and locator 128 is adjusted so that it properly engages between adjacent teeth of the work. Other gears in the series can then be easily and quickly positioned to match or engage properly with the grinding wheel 36 by positioning the latter in the predetermined initial position and rotatively adjusting the gear so that the locator 128 enters any tooth space.

As shown in Fig. 2, the grinding wheel 36 is mounted on a horizontal spindle 132 which in turn is journaled for rotation in a tubular housing 134. The latter is formed integrally with or mounted on the slide 32 and is located so as to position the axis of the grinding wheel substantially midway between the extreme upper and lower positions of the workpiece (Fig. 4). Spindle 132 extends through housing 134 for driven engagement with driving mechanism hereinafter described in detail.

In order to enable the operator to bring grinding wheel 36 to the predetermined initial position, a disk 136 is fixed on the projecting rearward portion of spindle 132. This disk projects above housing 134, and the projecting marginal portion thereof is provided with a suitable reference mark (not shown) which registers with a stationary reference mark 138 on housing 134 when grinding wheel 36 is in the selected position.

In order to adjust grinding wheel 36 to the proper depth of cut, mechanism is provided for moving slide 32 longitudinally on slide base 30, and this mechanism comprises a feed screw 140 which is supported by stationary spaced bearings 142 (Fig. 4). At its inner end the feed screw 140 threadably engages a depending lug 144 on slide 32. At its outer end feed screw 140 carries a manually operable hand wheel 146. Thus, slide 32 is advanced or retracted by manually rotating hand wheel 146, and the periphery of the wheel is provided with a graduated scale 148 (Fig. 2) which co-operates with a stationary reference mark 150 on bracket 152 to indicate the adjusted position of the slide.

Feed screw 140 has a relatively fine thread to secure accurate adjustment of slide 32. Consequently the rate of travel of the slide is slow when actuated by hand wheel 146. In order to back grinding wheel 36 rapidly away from workpiece 28 after the latter reaches the upper limit of its travel, bearings 142 are mounted in an externally threaded sleeve 154, which sleeve operates in an internally threaded supporting bracket 156 mounted on the slide base 30. Sleeve 154 is rotated by a manually operable lever 158. The external thread 160 of sleeve 154 has a very long lead so that the sleeve is moved rapidly in an axial direction when rotated. At its outer end sleeve 154 is formed with an enlarged head 162 which seats against bracket 156 to limit forward movement of the sleeve and to assure identical positioning of slide 32 when the sleeve is fully advanced.

Thus hand wheel 146 can be used to obtain a fine adjustment of grinding wheel 36 relative to workpiece 28, and handle 158 can be operated to retract the grinding wheel and slide assembly rapidly after each grinding operation. In addition, after each new workpiece 28 is clamped on the fixture 88, handle 158 can be actuated for rapid traverse of the grinding wheel assembly toward the work, and the arrangement is such that the grinding wheel is returned to precisely the same position after each operation.

Crush roller 40, which is of substantially the same diameter as the grinding wheel 36 and is made of hardened steel or other suitable hard material, is mounted on spindle 164 which in turn is journaled for rotation in a horizontal tubular housing 166 fastened to or formed integrally on the upper slide 34. As shown in Fig. 4, the slide supports the roller in horizontal alignment with grinding wheel 36. Thus the arrangement is such that slide 34 can be advanced to bring the crush roller 40 into peripheral engagement with grinding wheel 36 for dressing the latter.

Provision is made for assuring proper matching or engagement of the threaded peripheral surfaces of the grinding wheel 36 and crush roller 40 and for rotating the wheel and roller synchronously in opposite directions at a suitable rate of speed.

Provision also is made for feeding the crush roller 40 under power against the grinding wheel 36 and for manually advancing and retracting slide 34 to engage or disengage the power drive. This mechanism is shown in Fig. 4 and comprises a feed screw 168 which is journaled for rotation in a suitable bracket 170 bolted or otherwise fastened at the outer end of slide 34. The threaded inner end of screw 168 operates in an internally screw-threaded lug 172 mounted on and fixed to the subjacent slide 32, and the outer end thereof carries a hand wheel 174. Thus, slide 34 is advanced or retracted, depending upon which direction hand wheel 174 is rotated. The adjusted position of slide 34 on slide 32 is indicated by a stationary reference mark 178 (Fig. 2) which co-operates with a graduated scale 176 on the periphery of hand wheel 174.

The high speed rotary drive mechanism for operating workpiece 28 and grinding wheel 36 in timed relation with each other and for simultaneously raising the work spindle head 26 at a predetermined constant speed is now described in detail. The driving power for this mechanism is supplied by a motor 180 on the stationary work head column 22. The drive shaft 182 of the motor is connected to a sleeve 184 by pulleys 186 and 188 and an endless belt 190. Sleeve 184 is journaled for rotation in a horizontal housing 192 and is connected by a conventional multiple disk clutch 194 to a countershaft 196 which is journaled in and extends between a gear housing 198 on the work-head column 22 and a gear housing 200 on the grinding wheel housing 134.

The right-hand or inner end of countershaft 196 rotatably drives the grinding wheel 36. As shown in the drawing, shaft 196 carries a sleeve 202, and a splined connection is provided between the shaft and sleeve to accommodate movement of the slide 32. Sleeve 202 in turn carries a bevel gear 204, and this gear meshes with a bevel gear 206 on the grinding wheel spindle 132. Gears 204 and 206 may be in any desired ratio, but in any event the ratio should be such that grinding wheel 36 is driven at a suitable grinding speed in the order of 5100 R. P. M.

The left-hand or outer end of countershaft 196 rotatably drives the work spindle 78 and also drives mechanism for raising the work spindle head 26. As shown in the drawing, shaft 196 carries a pinion 208 which drives reduction gears 210, 212, and 214 in the gear housing 198. The reduction gearing, in turn, transmits motion to a driven shaft 216 through change gears 218, 220, 222, and 224. Access is had to the change gears through an opening 226 in housing 198, which opening is normally closed by a removable cover 228. As best shown in Fig. 3, shaft 216 is journaled adjacent its ends in bearings 42 and 230, and its inner end drives a vertical shaft 232 through bevel gears 234 and 236. Shaft 232 is journaled in and held stationary by spaced bearings 238 and 240. Its upper end drives the mechanism for raising the work spindle head 26, and its lower end drives the mechanism for rotating the work spindle 78.

The latter mechanism is first described, and it will be observed that the splined lower portion of shaft 232 drives a vertically slidable sleeve 242 which carries a spur gear 244. Sleeve 242 is journaled in a supporting housing 246 and the latter is fastened to the work spindle head 26 by bolts 248 so that it and the elements carried thereby move vertically with the head. Housing 246 also rotatably supports an idler gear 256 which meshes with gear 244 and drives a spur gear 258 (Fig. 4). The latter gear is keyed or otherwise fixed on the work spindle 78 and is held solidly against a radial shoulder 260 by a retainer ring 262 so that it also moves vertically with the head 26 and spindle. Thus, workpiece 28 and grinding wheel 36 are rotated simultaneously from opposite ends of countershaft 196 but the workpiece is rotated at a much slower rate of speed than the grinding wheel by reason of reduction gears 210—214 and change gears 218—224.

As suggested, the speed at which the workpiece 28 rotates varies according to its size and usually is determined as a function of the number of teeth in its periphery. This speed can be adjusted according to the exigencies of the particular situation by varying the ratios of change gears 218—224. Although the device will operate satisfactorily over a range of ratios between the workpiece 28 and grinding wheel 36, it is preferred that the ratio be such that the workpiece advance one tooth for each revolution of the grinding wheel.

During operation of the machine a drag is produced on the spindle 78 to prevent reversal of back lash in the driving gears when the spindle is stopped, by means of a brake shoe 264. As shown in Fig. 4, brake shoe 264 is urged against spindle 78 by spring 266, and the pressure exerted by the spring is regulated by an adjustable thumb screw 268.

The mechanism for raising work spindle head 26 now described comprises a vertical feed screw 270 which is driven from shaft 232 through reduction gears 272 and 274 and change gears 276, 278, 280, and 282. The reduction gears 272 and 274 are disposed in the swivel 24 and the change gears 276—282 are suitably journaled and supported in a housing 284 on the swivel. Access is had to the change gears for varying the speed at which the work spindle head 26 travels to translate the work 28 by means of a removable cover 286. When grinding helical gears, the head 36 must be actuated to move the work axially in timed relation to the rotative speed of the wheel and work in order to compensate the lateral component of movement of the work as it traverses the grinding wheel and to maintain proper meshed engagement between the gear teeth and the cutting thread of the wheel. According to the present invention, the work is moved positively in an axial direction by the gear train hereinabove referred to, and the speed at which it travels can be varied by changing the gear ratios between change gears 276—282. As best shown in Fig. 5, feed screw 270 extends into the head 26, and a portion thereof within the head is externally threaded as at 288. Mounted on portion 288 is an internally threaded nut 290 which is supported in a tubular housing 292 by spaced bearings 294. The housing is bolted or otherwise fastened to work spindle head 26 so that the latter is slidably actuated either when the feed screw 270 is rotated and nut 290 is held against rotation or when the feed screw is held stationary and the nut is rotated.

For power actuation of head 26, the nut 290 is held stationary and feed screw 270 is rotatably driven in the manner hereinabove described. In this connection a suitable clamping mechanism is provided for the nut, which mechanism conveniently may be of the type shown in Fig. 10. The clamping mechanism here shown comprises a horizontal shaft 296 which extends into head 26 laterally of nut 290 and is journaled for rotation on suitable supporting bearings 298. Fixed on the shaft 296 at opposite sides of the nut 290 are identical eccentric cams 300 which carry collars 302 having shank portions 304 slidably journaled in bearings 305 and joined by a clamping bar 306. It will be observed that shaft 296 and clamping bar 306 are arranged at opposite sides of nut 290, and it will be readily apparent that the clamping bar can be tightened against or released from the nut by rotating shaft 296. This latter operation is accomplished by means of a manually operable handle 308 on the forward end of shaft 296.

Thus, to raise head 26, the power drive is operated to rotate feed screw 270, and handle 308 is actuated to clamp nut 290. As a result, the nut moves upwardly on feed screw 270 and carries the head 26 along with it. When head 26 moves upwardly, workpiece 28 is moved across the cutting face of grinding wheel 36.

After each grinding operation is completed, the work spindle head 26 is lowered manually by a hand wheel 310 which is mounted on a shaft 312 and operates bevel gears 314 and 316. As shown in Fig. 5, shaft 312 is journaled for rotation in head 26, gear 314 is fast on the inner end of the shaft, and gear 316 is fixed on the upper end of nut 290. Manual return of the work spindle head 26 is necessary, since the power drive mechanism, including feed screw 270, is stopped after the grinding operation and it is necessary to lower the head before the next grinding operation is begun.

Lowering the work head 26 in the above manner tends to reverse the back lash in all of the gears which drive feed screw 270; and, to prevent this action, a free wheeling clutch 318 of known construction is mounted between the feed screw and the driving spindle or shaft 319 of gear 282 (Fig. 3). This clutch allows feed screw 270 to turn freely in one direction for feeding the work spindle head 26 upwardly but prevents the same from rotating in the opposite direction. After work spindle head 26 has been lowered to the initial or starting position as indicated on dial 64, handle 308 is operated to clamp nut 290 and the mechanism is again set for power operation.

The slow-speed drive mechanism for synchronously rotating grinding wheel 36 and crush roller 40 and for simultaneously pressing the latter against the grinding wheel is now described. As best shown in Fig. 2, the motor 180 is provided with an integral gear head 320 having a slow-speed drive shaft 322 which drives a sleeve 324 through pulleys 326 and 328 and an endless belt 330. Sleeve 324 is associated with the multiple disk clutch 194 in the same manner as sleeve 184. Thus, the arrangement is such that clutch 194 can be operated to disconnect both sleeve 184 and sleeve 324 simultaneously from shaft 196 or to selectively connect either of these sleeves to the shaft.

As shown in Fig. 9, clutch 194 is operated by a lever 332 which is carried by a rock shaft 334. The latter is rotatably supported by work-head column 20 and is arranged horizontally under the clutch. At the inner end of rock shaft 334 is an upstanding dog 336 which engages the clutch shifter 338. When handle 332 is positioned upright as shown in the drawing, clutch 194 is in neutral position and countershaft 196 is stationary; when the handle is moved to the left, sleeve 184 is coupled to the countershaft for high-speed operation; and, when the lever is moved to the right, sleeve 326 is coupled to the countershaft for slow-speed operation.

Thus, in the latter position of handle 332, grinding wheel 36 is rotatably driven relatively slowly at a speed suitable for crush dressing. This speed may vary, depending on the circumstances, but speeds in the order of 160—190 R. P. M. have been found to be most satisfactory for grinding wheels of the size and type here shown.

As suggested, the crush roller 40 is not actuated when slide 34 is retracted. In order to dress the grinding wheel 36, it is necessary initially to advance slide 34 by manually actuating hand wheel 174 in the manner described. As shown in Fig. 2, slide 34 is equipped with a drive shaft 340 which is disposed in alignment with countershaft 196 and is supported adjacent its ends by bearings 342 and 344. Shaft 340 projects into a gear housing 346 on housing 166 and carries a bevel gear 348 which meshes with a bevel gear 350 on the rearward end of the crush roller spindle 164. Mounted on drive shaft 340 ahead of gear 348 is a clutch element 352 which is positioned to engage a second clutch element 354 on countershaft 196. The latter clutch element is slidably and rotatably fixed on countershaft 196, and, although clutch element 352 is rotatably fixed on drive shaft 340, it is adapted for limited sliding movement and is preloaded by a suitable compression spring 356. The two clutch elements 352 and 354 engage just before the crush roller 40 contacts grinding wheel 36, and the dogs which lock them together are unevenly spaced so that they can interengage in only one relative rotative position, viz., when crush roller 40 and grinding wheel 36 are positioned to engage properly with each other. Manifestly, if clutch 352 engages clutch 354 when the dogs are out of register with each other, the former slides on drive shaft 340 against the action of spring 356 until the latter clutch element rotates sufficiently to effect proper engagement. When clutch elements 352 and 354 are engaged, crush roller 40 is driven synchronously and in the opposite direction to grinding wheel 36, and drive shaft 340 is rotated directly with countershaft 196.

Once clutch elements 352 and 354 are engaged, it no longer is necessary to actuate slide 34 manually, since shaft 340 also drives mechanism for automatically slowly advancing the slide (Fig. 5). The automatic mechanism comprises an eccentric 358 which rotates with shaft 340 and actuates a pivoted pawl lever 360 through a connecting link 362. A pawl 364 pivoted on lever 360 operates a ratchet wheel 366 which is keyed or otherwise rotatably fixed on feed screw 168.

In operation, the eccentric 358 acts through link 362 to oscillate the pawl lever 360. The latter, in turn, actuates pawl 364 to index the ratchet wheel 366 and produce a slow feed motion of slide 34. A stop pawl 368 keeps ratchet wheel 366 from reversing when pawl 364 moves back over the ratchet teeth after each advance.

In order to release the ratchet wheel 366 for manual return of the slide 34 by hand wheel 174 after the dressing operation, a freely rotatable pawl lifter is mounted behind the ratchet wheel for simultaneously disengaging pawl 364 and stop pawl 368 from the wheel. Pawl lifter 370 is actuated manually by a handle 372 which normally is held against a stop 374 by a spring 376 to hold the pawl lifter disengaged from the pawl and stop pawl members.

In operation, handle 372 is depressed to disengage pawl 364 from ratchet wheel 366, and this action stops the automatic power operation of slide 34. The latter can then be retracted manually by hand wheel 174. As soon as slide 34 is retracted sufficiently so that clutch elements 352 and 354 disengage, handle 372 can be released. Spring 376 then raises the handle automatically and releases pawl 364 and stop pawl 368 so that they again engage ratchet wheel 366. Thus when handle 372 is released, the parts are positioned automatically for power operation of slide 34 when it is again advanced to engage clutch elements 352 and 354. Manifestly, the crush roller 40 ceases to rotate when clutch element 352 disengages clutch element 354, and, since clutch disengagement also renders inoperative the automatic power-drive mechanism for slide 38, the crush roller is not fed toward the grinding wheel 36 when grinding operations are resumed.

During the crushing operation, countershaft 196 is still connected to the work spindle head feed screw 270 so that the work spindle head 26 moves upwardly. However, by reason of the reduced speed at which countershaft 196 is operated and the reduction gearing intermediate the countershaft and feed screw 270, the upward movement of head 26 is very slow. Ample time is thus provided to complete the dressing operation before head 26 reaches the upward limit of its travel. In any event, head 26 is lowered manually by hand wheel 310 to the initial position after the dressing operation. It is desirable that the feed screw 270 be operated continuously during the dressing operation in order that the relative rotary position of the grinding wheel 36 and the work spindle 78 be not disturbed as would be the case if the work spindle were disconnected from the drive at this time.

It is to be understood that the form of the invention herewith shown and described is to be taken as the preferred example of the same and that various changes in the size, shape, and arrangement of parts may be resorted to without departing from the spirit of the invention or the scope of the appended claims.

Having thus described the invention, I claim:

1. In a continuous gear-grinding machine, the combination of work-supporting means including mechanism for simultaneously rotating and translating the work; a grinding wheel having a peripheral cutting surface shaped to complement the surface of the work to be ground, and adjustable so that said cutting surface moves across the work during translatory movement of the latter; a crush roller mounted in proximity to said grinding wheel having a dressing surface which complements the cutting surface of said grinding wheel; means for adjusting the grinding wheel and work into operative relation with each other; means for moving the grinding wheel and crush roller into operative relation with each other; drive means for rotatably driving the grinding wheel and work-supporting mechanism in timed relation and for simultaneously translating the work-supporting mechanism in one direction to move the work across the cutting face of the grinding wheel; and drive means for simultaneously rotatably driving the grinding wheel, crush roller and work-supporting mechanism in timed relation, said drive means constructed and arranged to rotate the grinding wheel and crush roller in opposite directions and at the same peripheral speed, and said work-supporting mechanism being rotated in timed relation to but slower than the grinding wheel and the crush roller.

2. In a continuous gear-grinding machine, the combination of work-supporting means including mechanism for simultaneously rotating and translating the work; a grinding wheel having a cutting surface and arranged so that said cutting surface engages and traverses the work during translatory movement of the latter; a crush roller normally disengaged from the grinding wheel but movable against said cutting surface to dress the same; means for rotatably driving the grinding wheel at a predetermined grinding speed and in a predetermined ratio to the rotative speed of the work; and means for rotatably driving the crush roller and grinding wheel in synchronism at a different predetermined dressing speed, said last means coactive and correlated with the mechanism for rotating the work so that the latter continues to operate in timed relation with the grinding wheel during the dressing operation.

3. In a continuous gear-grinding machine, the combination of work-supporting means including power-actuated mechanism for rotating the work and simultaneously translating it automatically in one direction; manually operable means for translating the work in a reverse direction; a grinding wheel arranged for peripheral engagement with the work; an adjustable mounting for said grinding wheel, said mounting including a slide operable to position the wheel so that its cutting surface traverses the periphery of the work during translatory movement of the latter; a crush roller slidably mounted for movement relative to the grinding wheel, said roller and wheel being normally apart but adapted for mutual peripheral engagement to dress the latter; means for rotatably driving the grinding wheel at a predetermined grinding speed and in a predetermined ratio to the rotative speed of the work; and means for simultaneously rotatably driving the grinding wheel, crush roller and work-supporting mechanism at a predetermined speed slower than said grinding speed and suitable for crush dressing said wheel, said wheel and roller rotated in synchronism and said work-supporting mechanism rotated in timed relation to but slower than the wheel and roller.

4. In a continuous gear-grinding machine, the combination of a rotatable grinding wheel having a peripheral cutting thread; means for rotatably driving the grinding wheel at a predetermined grinding speed; work-supporting means adapted to rotate a gear or gear blank to be ground and simultaneously to move it axially so that the gear teeth mesh with and move across the cutting thread of the grinding wheel; means for rotatably driving said work-supporting means in timed relation to the grinding wheel and for simultaneously translating it automatically in one direction; and manually actuated means operable independently of said driving means for translating the work in a reverse direction.

5. In a continuous gear-grinding machine, the combination of a rotatable grinding wheel having a helical peripheral cutting thread; means for rotatably driving the grinding wheel at a predetermined grinding speed; work-supporting means adapted to rotate a gear or gear blank to be ground and simultaneously to move it axially so that the gear teeth mesh with and move across the cutting thread of the grinding wheel; means for rotatably driving said work-supporting means in timed relation to the grinding wheel and for simultaneously translating it automatically in one direction; manually actuated means operable independently of said driving means for translating the work in a reverse direction; a crush roller having a peripheral thread shaped to mate with and opposite hand to the cutting thread on said grinding wheel; means for moving said grinding wheel and said crush roller into operative relation; and means operable independently of said first-drive means for simultaneously rotating the grinding wheel, crush roller and work-supporting mechanism at a predetermined speed slower than said grinding speed and suitable for crush dressing said wheel, said wheel and roller rotated in synchronism and in opposite directions and said work-supporting mechanism rotated in timed relation to but slower than the wheel and roller.

6. In a continuous gear-grinding machine, the combination of work-supporting means including mechanism for simultaneously rotating and translating the work; a grinding wheel having a peripheral cutting surface shaped to complement the surface of the work to be ground and adjustable so that said cutting surface moves across the work during translatory movement of the latter; a crush roller mounted in proximity to said grinding wheel having a dressing surface shaped to complement the cutting surface of said grinding wheel; means for adjusting the grinding wheel and work into operative relation with each other; means for moving the grinding wheel and crush roller into operative relation with each other; a relatively high speed drive for said work-supporting mechanism and said grinding wheel adapted to rotate the same simultaneously at a speed suitable for grinding and in timed relation to each other; mechanism driven by and operable in timed relation to said high-speed drive for simultaneously translating the work-supporting mechanism to move said work across the face of the grinding wheel; and a relatively slow speed drive for said grinding wheel, crush roller and work-supporting mechanism, said slow-speed drive adapted to rotate the grinding wheel and crush roller synchronously but in opposite directions and to rotate said work-supporting mechanism at a slower speed but in timed relation to said grinding wheel and crush roller.

7. The combination as set forth in claim 6 wherein the means for moving the grinding wheel and crush roller into operative relation with each other includes a horizontally movable slide carrying said crush roller; a feed screw coactive with said slide to actuate the same; and means for transmitting motion from said slow-speed drive to said feed screw.

8. The combination as set forth in claim 6 wherein the means for moving the grinding wheel and crush roller into operative relation with each other includes a horizontally movable slide carrying said crush roller, a feed screw for actuating said slide; and means including a pawl and ratchet mechanism for operatively connecting said slow-speed drive to the feed screw.

9. The combination as set forth in claim 6 wherein the means for moving the grinding wheel and crush roller into operative relation with each other include a horizontally movable slide carrying said crush roller; and mechanism for transmitting motion from said slow-speed drive to the slide including a feed screw for actuating said slide, a drive shaft, an eccentric pivot on said drive shaft, a pawl ratchet lever associated with the feed screw, a link connecting the eccentric pivot to said lever adapted to impart an oscillatory movement to the latter, a ratchet wheel fixed on said feed screw, and a pawl pivoted on said lever and coactive with the ratchet wheel to rotatably actuate the same.

10. The combination as set forth in claim 6 wherein the means for moving the grinding wheel and crush roller into operative relation with each other includes a horizontally movable slide carrying said crush roller; manually operable means including a feed screw for actuating said slide; and means for actuating said slide from the slow-speed drive including a pair of axially aligned drive shafts, one of said shafts carried by and movable with the slide, power-actuated means driving the other of said drive shafts, clutch elements carried by said drive shafts adapted to connect the shafts for mutual operation when the slide is advanced by said manual actuator means and to disconnect the same when the slide is retracted by said manual actuator means; means for transmitting motion from said one drive shaft to the crush roller, and means for transmitting motion from said one drive shaft to the feed screw, whereby said slide is manually actuated to engage or disengage the clutch elements and whereby said crush roller and said slide are power-actuated when said clutch elements are engaged.

11. In a continuous gear-grinding machine, the combination of a rotatable grinding wheel having a helical peripheral cutting thread; means for rotatably driving the grinding wheel at a predetermined grinding speed; work-supporting means for rotating work to be ground; means for rotatably driving said work-supporting means in timed relation to the grinding wheel; a crush roller having a peripheral thread shaped to mate with and opposite hand to the cutting thread on said grinding wheel; means for moving said grinding wheel and said crush roller into operative relation; and means operable independently of said first drive means for simultaneously rotating the grinding wheel, crush roller and work-supporting mechanism at a predetermined speed slower than said grinding speed and suitable for crush dressing said wheel, said last means operable to rotate the wheel and roller in synchronism and in opposite directions and to rotate said work-supporting means in timed relation to but slower than the wheel and roller.

12. In a continuous gear-grinding machine, a grinding wheel; a crush roller; means for moving said grinding wheel and said crush roller translatively into and out of peripheral engagement; mechanism for rotatably driving said grinding wheel; mechanism for rotatably driving said crush roller; and clutch means for connecting said drive mechanisms; said clutch means constructed and arranged to disengage said drive mechanisms when the grinding wheel and crush roller are a maximum distance apart and to engage said drive mechanisms when the grinding wheel and crush roller are moved toward each other prior to actual contact between the wheel and roller.

13. The combination as set forth in claim 12 wherein said translating means is correlated with said clutch means and said rotary drive mechanisms so as to be manually operable when said clutch means is positioned to disengage said rotary drive mechanisms and to be mechanically operable when said clutch means is positioned to engage said rotary drive mechanisms.

14. The combination as set forth in claim 12 wherein said clutch means is engageable only when said grinding wheel and said crush roller are in predetermined rotative positions with respect to each other.

15. In a continuous gear-grinding machine, a grinding wheel; a crush roller; a slide carrying said crush roller and operative to move the same relative to said grinding wheel; a first mechanism for rotatably driving said grinding wheel; a second mechanism for rotatably driving said crush roller; clutch means for connecting said first and second drive mechanisms for mutual operation when the slide is actuated to move said crush roller into operative relation with the grinding wheel; and means actuated by said first drive mechanism for moving said slide in a direction to advance said crush roller toward said grinding wheel.

16. In a continuous gear-grinding machine, a grinding wheel; a crush roller; a slide carrying said crush roller and operative to move the same relative to the grinding wheel; a first mechanism for rotatably driving said grinding wheel; a second mechanism for rotatably driving said crush roller; clutch means for connecting said first and second mechanisms for mutual operation when the slide is actuated to move said crush roller into crushing relation with said grinding wheel; rapid traverse means for actuating said slide; and automatic means driven by said second rotary drive mechanism for actuating said slide to feed the crush roller relatively slowly against said grinding wheel.

17. The combination as set forth in claim 16 wherein said rapid traverse means is manually operable and constructed and arranged both to advance and to retract said slide whereby to engage or disengage said clutch means; and wherein said automatic feed mechanism is operable only to advance said slide and only when said clutch means is engaged.

18. In a continuous gear grinding machine, a work supporting means; a grinding wheel for mutual peripheral engagement with work on said supporting means; a slide carrying said grinding wheel operable to move the same relative to said work supporting means; and two-part means for actuating said slide comprising a manually operable screw threadedly engaged with said slide, a stationary member and a manually operable screw threaded on said first screw and threaded into said stationary member; said first screw being constructed and arranged to move the slide relatively slowly and to selectively position the same a predetermined distance from said work supporting means, said second screw being constructed and arranged to retract said slide relatively rapidly from said selected position and to advance the same relatively rapidly from a retracted position to said selected position.

19. The combination as set forth in claim 18 wherein said first-mentioned screw has a relatively short lead, and wherein said second-mentioned screw has a relatively long lead.

PAUL KLAMP.

REFERENCES CITED

The following references are of record in the file of this patent:

UNITED STATES PATENTS

| Number | Name | Date |
|---|---|---|
| 1,008,838 | Lundgren | Nov. 14, 1911 |
| 1,640,993 | Hanson | Aug. 30, 1927 |
| 1,642,554 | Olson | Sept. 13, 1927 |
| 1,693,781 | Hanson | Dec. 4, 1928 |
| 1,720,620 | Bayton | July 9, 1929 |
| 1,753,448 | Smith | Apr. 8, 1930 |
| 1,823,734 | Garrison | Sept. 15, 1931 |
| 1,985,213 | Page | Dec. 18, 1934 |
| 2,178,022 | Orcutt | Oct. 31, 1939 |
| 2,307,238 | Ross | Jan. 5, 1943 |
| 2,385,650 | Rickenmann | Sept. 25, 1945 |
| 2,424,191 | Rickenmann | July 15, 1947 |

FOREIGN PATENTS

| Number | Country | Date |
|---|---|---|
| 520,557 | Great Britain | Apr. 26, 1940 |